(12) United States Patent
Zhao et al.

(10) Patent No.: US 12,443,225 B1
(45) Date of Patent: Oct. 14, 2025

(54) EXTERNAL SCREEN DEVICE FOR SMARTPHONE

(71) Applicant: Shenzhen Xinzhengyu Technology Co., Ltd, Shenzhen (CN)

(72) Inventors: Lingzhong Zhao, Shenzhen (CN); Junhua Wu, Shenzhen (CN); Zhengping Zhao, Shenzhen (CN)

(73) Assignee: Shenzhen Xinzhengyu Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/977,836

(22) Filed: Dec. 11, 2024

(51) Int. Cl.
*G06F 1/16* (2006.01)
*G06F 1/18* (2006.01)

(52) U.S. Cl.
CPC .......... *G06F 1/1626* (2013.01); *G06F 1/1635* (2013.01); *G06F 1/184* (2013.01); *G06F 2213/0042* (2013.01)

(58) Field of Classification Search
CPC ...... G06F 1/1626; G06F 1/1635; G06F 1/184; G06F 2213/0042; G06F 1/16; G06F 1/18
See application file for complete search history.

(56) References Cited

U.S. PATENT DOCUMENTS

| | | | |
|---|---|---|---|
| 9,134,762 B2 * | 9/2015 | Del Toro | H04W 4/80 |
| 9,143,590 B2 * | 9/2015 | Goldman | H04M 1/72412 |
| 2017/0302098 A1 * | 10/2017 | Miller | H02J 7/342 |

FOREIGN PATENT DOCUMENTS

| | | | | |
|---|---|---|---|---|
| CN | 118590573 | * | 9/2024 | ............. H04M 1/02 |
| CN | 118590573 A | | 9/2024 | |

* cited by examiner

*Primary Examiner* — Yosef K Laekemariam
(74) *Attorney, Agent, or Firm* — FIDELI LAW PLLC; Qiang Li

(57) ABSTRACT

The disclosure discloses an external screen device for a smartphone, including a body. The body is provided with first, second and third connection interfaces. Through the first connection interface and a data line, the external screen device performs data signal transmission with the smartphone to receive data signals of the smartphone in real time, thereby providing a better livestreaming or photography effect. Through the second connection interface, power can be supplied to the external screen device and the smartphone, thereby ensuring normal operation of the external screen device. Through the third connection interface, livestreaming voice interaction and recording operations can be realized.

9 Claims, 5 Drawing Sheets

EXTERNAL SCREEN DEVICE FOR SMARTPHONE

BACKGROUND

1. Technical Field

The disclosure relates to the technical field of smartphone peripherals, and in particular to an external screen device for a smartphone.

2. Background Information

With the rapid development of technology, smartphones have become an essential multi-purpose tool for everyone. Smartphones have gradually replaced some electronic products, such as cameras, because of their portability. Particularly, during livestreaming and photography, livestreamers and vloggers have a strong demand for smartphones, and they have high requirements for their own expressions, postures, composition, angles and image quality, so they often need to adjust themselves in real time through the lens images in the smartphone screen. However, the front facing cameras of conventional smartphones generally have low pixel count and low shooting quality, which cannot meet the shooting needs of livestreamers and vloggers.

In order to solve this problem, there are external screens for smartphones in the market at present, but such external screens display the contents of smartphone screens mainly through WiFi transmission, which has the following main problems:
1. Usage of WiFi connection of smartphone: The WiFi transmission will use the WiFi connection of the smartphone, such that other applications that need network connection cannot be used normally.
2. High data transmission delay: The WiFi transmission is easily affected by the network environment, and there is a high transmission delay, which cannot meet the high requirements of livestreamers and vloggers for real-time and synchronization.
3. No wireless microphone interface: The existing products typically do not support an external wireless microphone, which limits the audio input options of livestreamers and vloggers for recording and livestreaming.

Therefore, the existing external screens need to be improved to solve the above problems.

BRIEF SUMMARY

In view of the problems in the prior art, a main objective of the disclosure is to provide an external screen device for a smartphone, which is designed and formed for smartphones. The external screen device has a first connection interface capable of transmitting data signals in real time, a second connection interface capable of charging and a third connection interface connectable to a microphone or wired earphones. In this way, the external screen device can display the contents of the smartphone screen in real time, and can be used for charging, microphone voice interaction and recording operations, thereby providing livestreamers and vloggers with convenient conditions for livestreaming and photography.

In order to achieve the above objective, the disclosure adopts the following technical solution:

An external screen device for a smartphone includes a body. The body is provided with a first connection interface connectable to a data line to realize data signal transmission with the smartphone and supply power to the external screen device, a second connection interface configured to be connected to an external power source to supply power to the external screen device and the smartphone, and a third connection interface configured to be connected to a microphone or wired earphones.

As a preferred solution, the body is provided with a magnet configured to fix the external screen device to a back of the smartphone by magnetic attraction.

As a preferred solution, the first connection interface is a Type-C or Lightning interface; the second connection interface is a Type-C interface; and the third connection interface is a Type-C interface or a 3.5 mm audio interface.

As a preferred solution, the third connection interface is a Type-C interface connectable to a wireless microphone.

As a preferred solution, the first connection interface and the second connection interface are both arranged on a lower end of the body, and the third connection interface is arranged on a side of the body.

As a preferred solution, a back of the body is provided with an annular groove, and the magnet is annularly distributed in the annular groove; and an outer side of the annular groove is covered with a back sticker.

As a preferred solution, the back of the body is further provided with a vertical groove below the annular groove, and a magnet is embedded in the vertical groove.

As a preferred solution, the body includes a casing, a circuit board and a screen, the circuit board is mounted in the casing, and the screen covers a side of the casing and is located above the circuit board and electrically connected to the circuit board; the first connection interface, the second connection interface and the third connection interface are all electrically connected to the circuit board; and the circuit board is provided with a mode button, and the mode button extends out of a side of the body.

As a preferred solution, a lower end of the body is further provided with an indicator lamp configured to indicate a working state of the external screen device, the circuit board is provided with a light guide column, and the light guide column extends out of the lower end of the body.

As a preferred solution, a length of the body is less than a length of the smartphone, and when the body is attached to a back of the smartphone, a rear facing camera of the smartphone is not blocked by the body.

Compared with the prior art, the disclosure has obvious advantages and beneficial effects: Specifically, based on the above technical solution, by designing an external screen device for a smartphone, the external screen device has the first connection interface capable of data signal transmission with the smartphone through the data line, the second connection interface capable of charging and the third connection interface connectable to the microphone or wired earphones. The wired connection between the external screen device and the smartphone is formed through the data line and the first connection interface. Compared with the traditional WiFi transmission, the wire transmission has high anti-interference ability and signal transmission stability, so that the external screen device can receive data signals of the smartphone in real time and display real-time contents of livestreaming or photography with low delay and high stability, thus providing a better livestreaming or photography effect. Moreover, the second connection interface is connectable to a charging power source to supply power to the smartphone and the external screen device, thereby ensuring normal operation of the smartphone and the external screen device. In addition, the third connection interface is connectable to the wireless microphone or wired earphones to provide a high-quality audio input option, so that the livestreamers and vloggers can perform livestreaming voice interaction and recording more conveniently, which meets the high requirements of the livestreamers and vloggers for audio input. The external screen device is detachably attached to the back of the smartphone through the magnets, so there is no need to separately provide a holder structure for the external screen device, which makes the external screen device more portable. Thus, the external screen device is more convenient to use and has better user experience.

In order to more clearly explain the structural features and efficacy of the disclosure, the disclosure will be described in detail in conjunction with the accompanying drawings and specific examples.

DESCRIPTION OF REFERENCE SIGNS

10, body; 11, first connection interface; 12, second connection interface; 13, third connection interface; 14, casing; 141, magnet; 142, annular groove; 143, back sticker; 144, vertical groove; 15, circuit board; 16, screen; 17, indicator lamp; 171, light guide column; 18, mode button 20, wireless microphone; 30, data line; 40, smartphone.

DETAILED DESCRIPTION OF THE DRAWINGS AND THE PRESENTLY PREFERRED EMBODIMENTS

Figure 1:
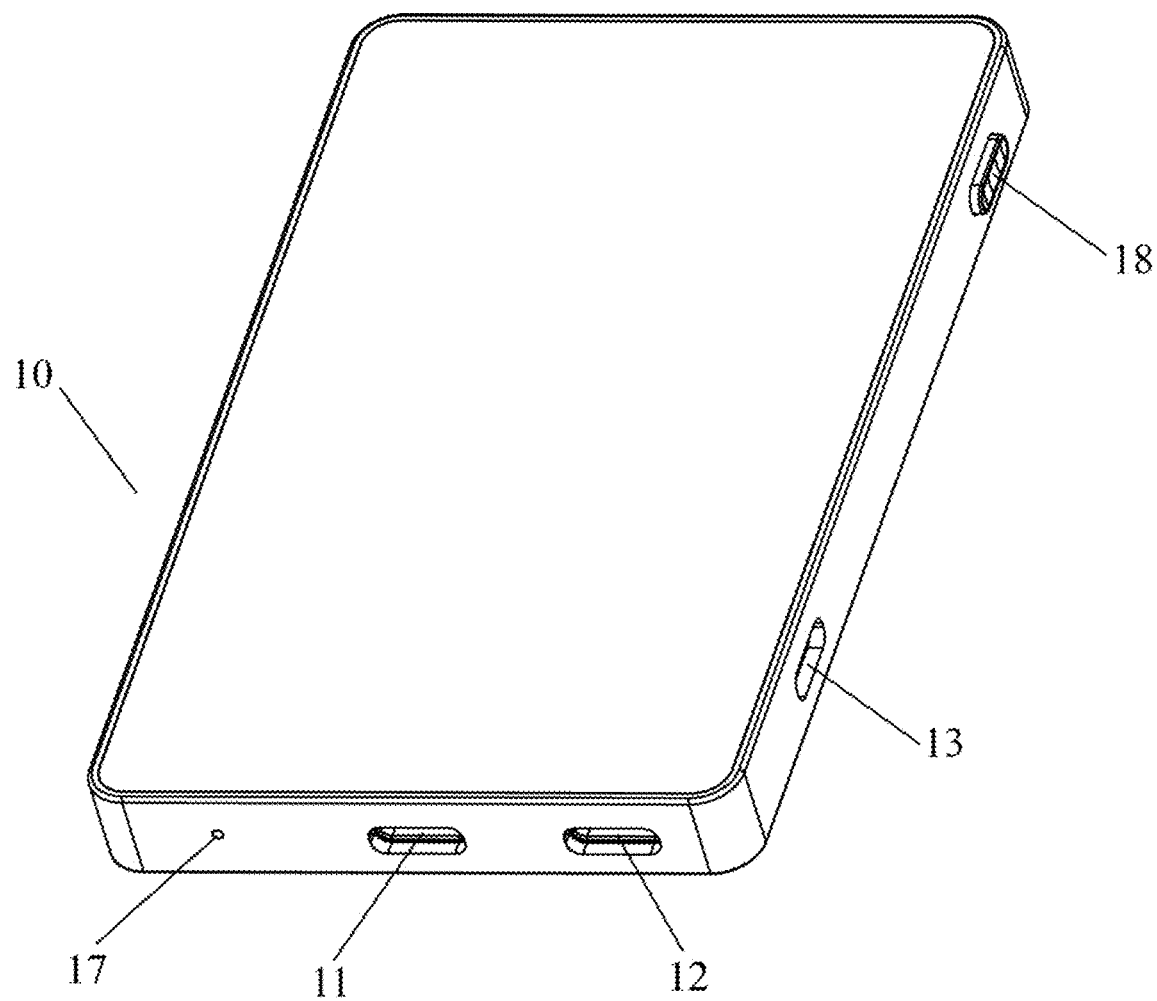
FIG. 1 is a schematic three-dimensional structural view of an external screen device of the disclosure.
Figure 2:
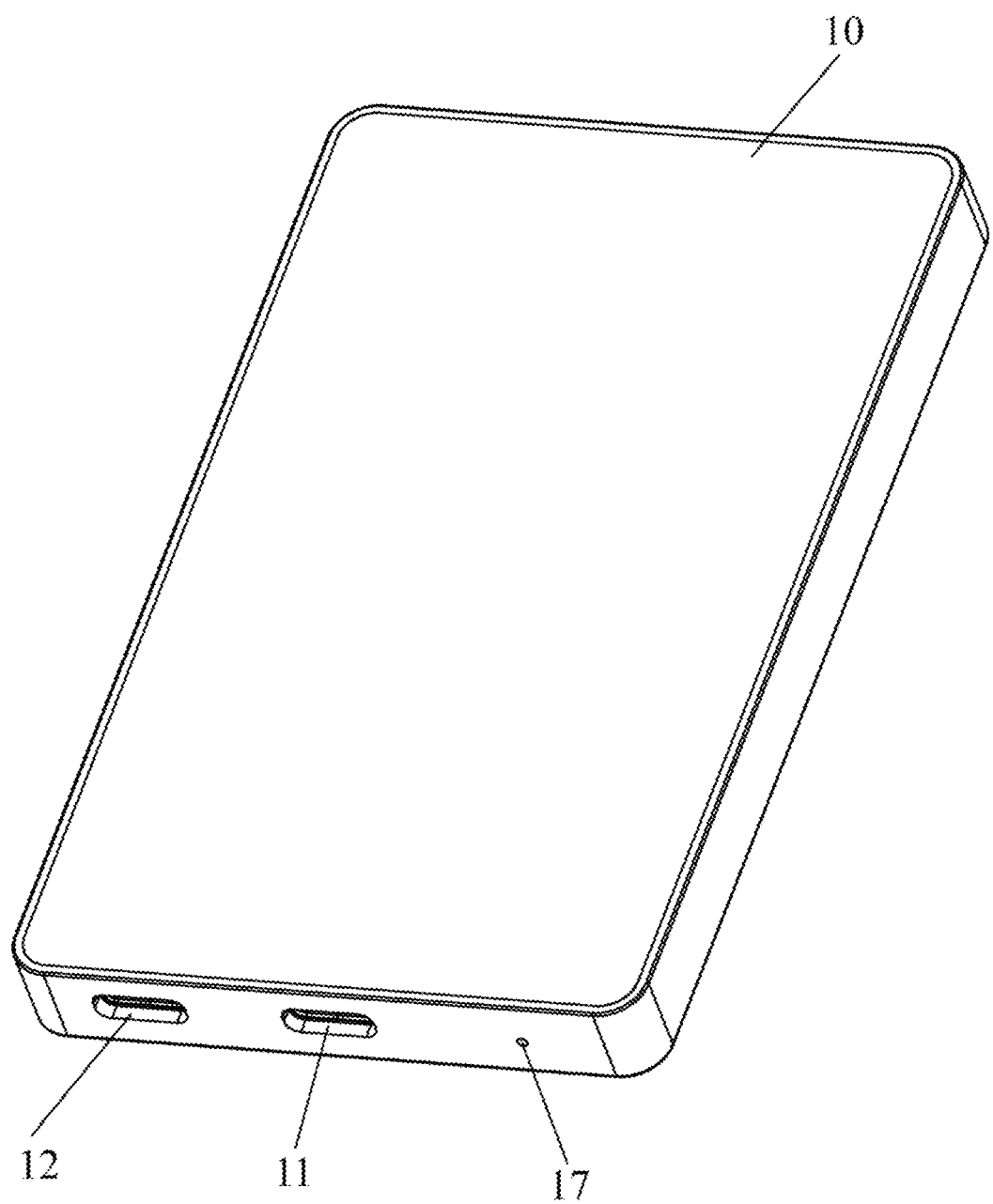
FIG. 2 is a schematic three-dimensional structural view of the external screen device of the disclosure from another viewing angle.
Figure 3:
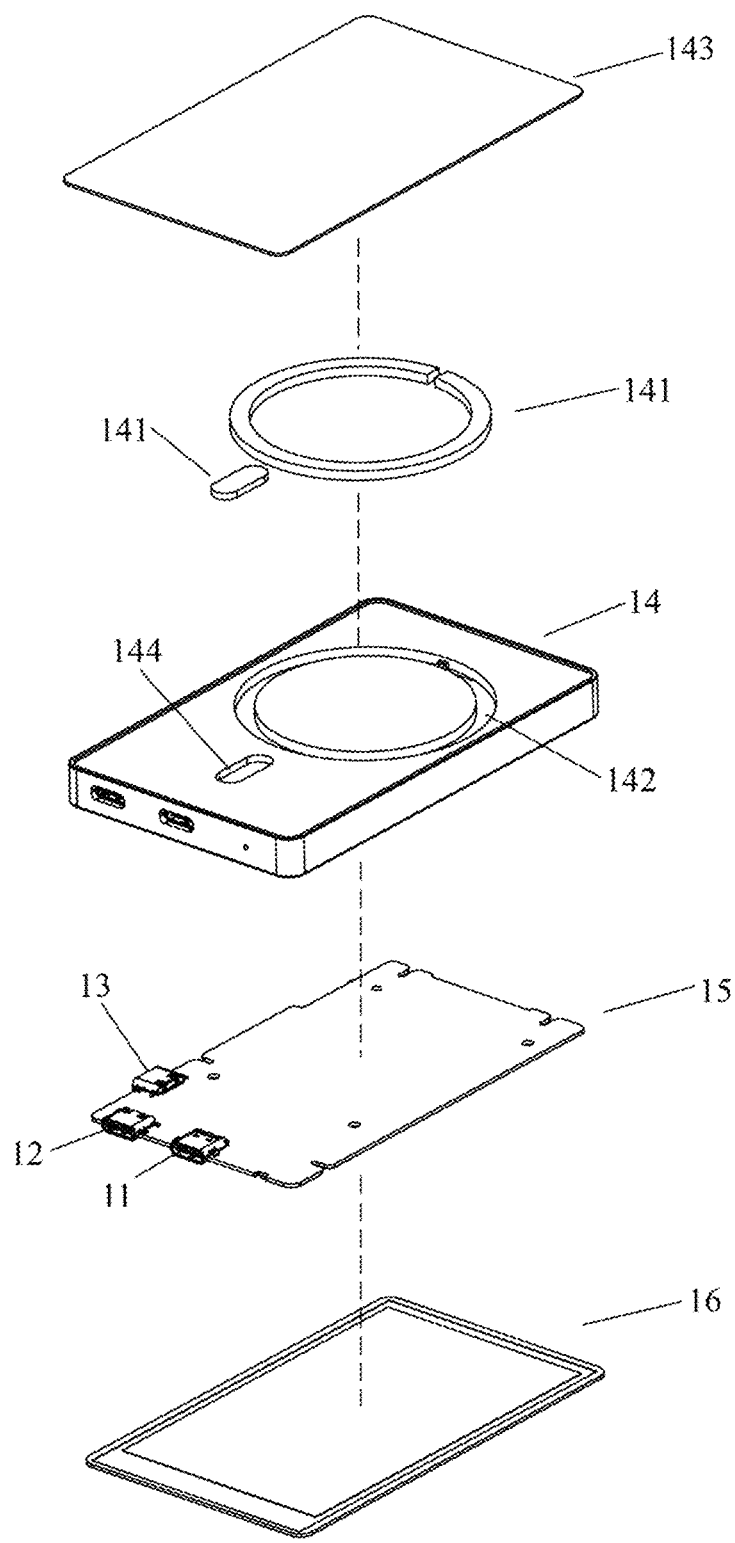
FIG. 3 is a schematic three-dimensional structural exploded view of the external screen device of the disclosure.
Figure 4:
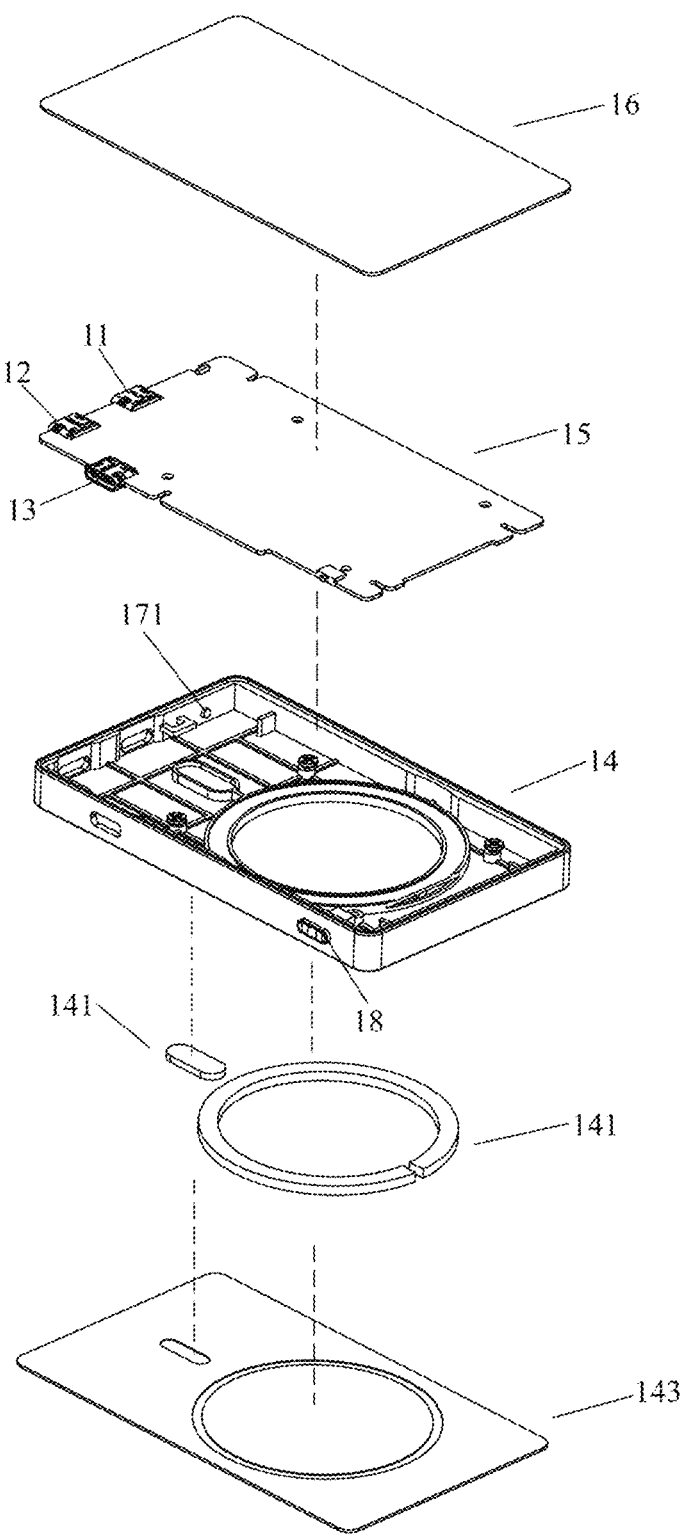
FIG. 4 is a schematic three-dimensional structural exploded view of the external screen device of the disclosure from another viewing angle.
Figure 5:
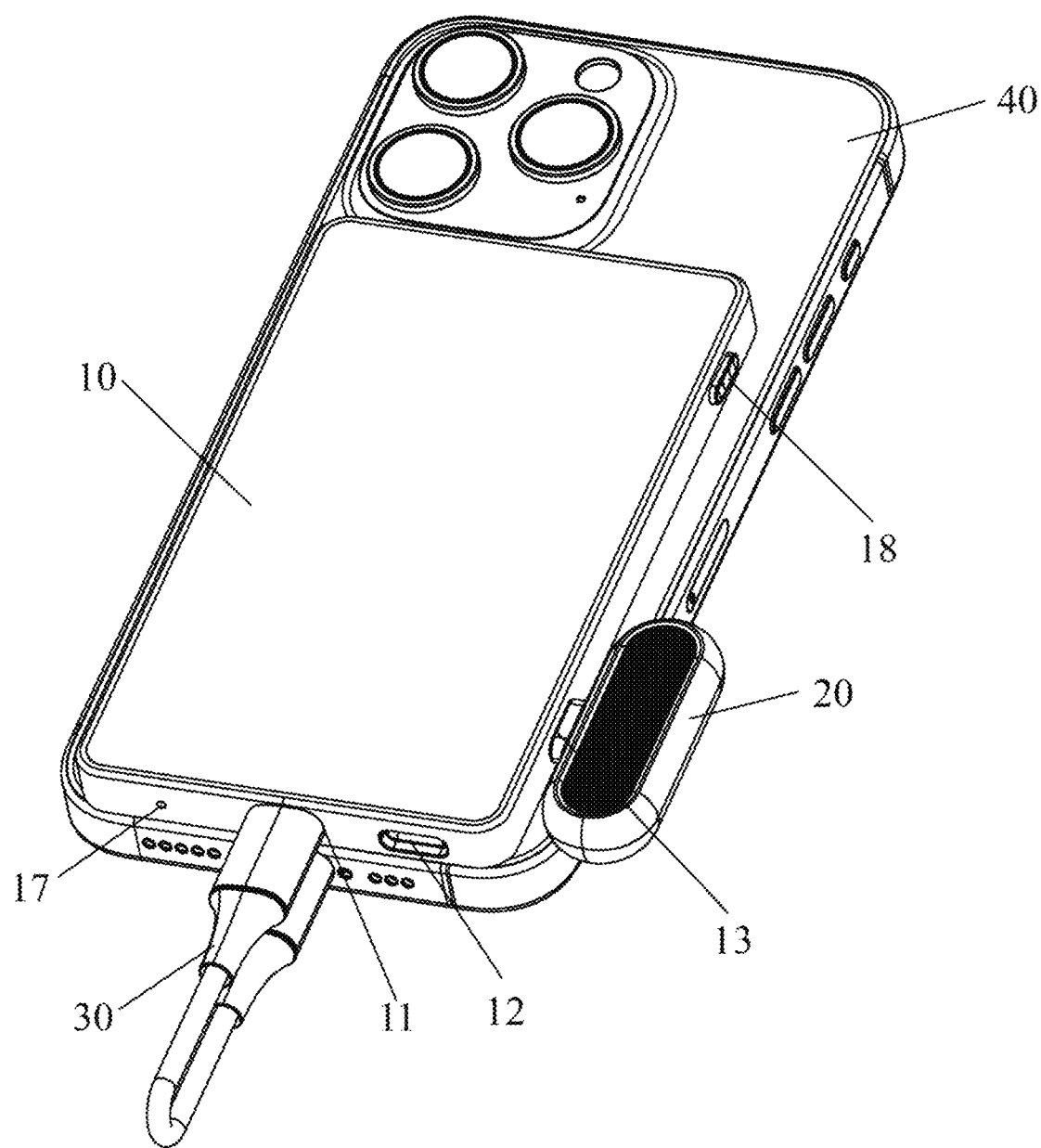
FIG. 5 is a schematic three-dimensional structural view of the external screen device of the disclosure when in use.

As shown in FIG. 1 to FIG. 5, an external screen device for a smartphone includes a body 10.

The body 10 is provided with a first connection interface 11 connectable to a data line 30 to realize data signal transmission with the smartphone 40 and supply power to the external screen device, a second connection interface 12 configured to be connected to an external power source to supply power to the external screen device and the smartphone 40, and a third connection interface 13 configured to be connected to a microphone or wired earphones.

The first connection interface 11 is a Type-C or Lightning interface. The second connection interface 12 is a Type-C interface. The third connection interface 13 is a Type-C interface or a 3.5 mm audio interface (applicable to smartphones with a 3.5 mm audio interface). In this example, the third connection interface 13 is a Type-C interface, and the third connection interface 13 is connectable to a wireless microphone 20, so that the livestreamer or vlogger can perform voice operations through a microphone receiving end, thereby improving the audio input quality. The first connection interface 11 and the second connection interface 12 are both arranged on a lower end of the body 10, and the third connection interface 13 is arranged on a side (on a right side in this example, or as required, on a left side or a top) of the body 10. The first connection interface 11, the second connection interface 12 and the third connection interface 13 are respectively arranged on the lower end and the side of the body 10, which can avoid increasing the width of the body 10 as they are all arranged on the lower end of the body 10. Thereby, the external screen device is small in size, and its width can adapt to the width of the smartphone screen.

The body 10 is light and thin, and includes a casing 14, a circuit board 15 and a screen 16. The circuit board 15 is mounted in the casing 14, and the screen 16 covers a side of the casing 14 and is located above the circuit board 15 and electrically connected to the circuit board 15. The first connection interface 11, the second connection interface 12 and the third connection interface 13 are all electrically connected to the circuit board 15. The circuit board 15 is provided with a mode button 18, and the mode button 18 extends out of a side of the body 10. The mode button 18 is mainly configured to adjust display settings and optimize multitask operation experience. The circuit board 15 is integrated with a processor and other electronic components so as to control the first connection interface 11, the second connection interface 12 and the third connection interface 13 to receive and send signals and supply power. A lower end of the body 10 is further provided with an indicator lamp 17 configured to indicate a working state of the external screen device. The circuit board is provided with a light guide column 171, and the light guide column 171 extends out of the lower end of the body 10. The light guide column 171 guides light emitted by the indicator lamp 17 out of the body.

The body 10 is further provided with a magnet 141 configured to firmly fix the external screen device to a back of the smartphone 40 by magnetic attraction, thereby ensuring the stability and convenience of the external screen device in use. In this example, a back of the body 10 is provided with an annular groove 142, the magnet 141 is an annular magnet embedded in the annular groove 142, and an outer side of the annular groove 142 is covered with a back sticker 143. The back sticker 143 is used for preventing the magnet 141 from being disengaged from the annular groove 142, and also making the back of the external screen flexibly attached to the back of the smartphone 40, thereby avoiding abrasion. The back of the body 10 is further provided with a vertical groove 144 below the annular groove 142, and a magnet 141 (tail magnet) is embedded in the vertical groove 144. The vertically distributed magnet 141 and the annular magnet 141 are combined, so that the magnetic contact area and region between the body 10 and the back of the smartphone 40 are larger, thereby improving the firmness of combination between the external screen device and the smartphone 40.

A length of the body 10 is less than a length of the smartphone 40 (with reference to the length of a smartphone commonly used in the market), and when the body 10 is attached to a back of the smartphone 40, a rear facing camera of the smartphone 40 is not blocked by the body 10, thereby ensuring smooth operations of the smartphone 40 in application scenarios requiring the use of a rear facing camera, such as livestreaming and photography.

The external screen device transmits the contents on the smartphone screen to the external screen device through the Type-C or Lightning interface in a wired manner, and the external screen device can be detachably attached to the back of the smartphone through the magnetic attraction design. This design solves the problems of high delay and use of WiFi connection caused by WiFi transmission in the existing products. Moreover, the addition of the interface for the wireless microphone further improves the user experience, thereby meeting the requirements of livestreamers and vloggers for high performance and convenience.

The use method and working principle of the external screen device are as follows: Before use, the external screen device is fixed to the back of the smartphone 40 by magnetic attraction, and the first connection interface 11 of the external screen device is connected to the data interface of the smartphone 40 through the data line 30. When the livestreamer or vlogger is livestreaming or photographing through the rear facing camera of the smartphone 40, the data signals of the smartphone 40 are transmitted to the external screen through the data line 30, and the external screen can display the livestreaming or photographing contents in real time. The external screen device obtains power from the smartphone through the first connection interface 11 and the data line 30, and the second connection interface 12 can be connected to a charging power source, such as a power bank so as to supply power to the smartphone 40 and external screen device, thereby providing power support for long time use of equipment, and ensuring long-term normal operation of the smartphone 40 and the external screen device.

When the second connection interface 12 is connected to the charging power source to supply power to the smartphone 40 and the external screen device, there are two power supply methods. First, the charging power source supplies power to the external screen device and the smartphone. Specifically, the current first reaches the external screen device, and then a part of electric energy is distributed and delivered to the smartphone through the data line and the first connection interface, so as to synchronously supply power to the external screen device and the smartphone. Second, the current of the charging power source enters the external screen device through the second connection interface 12 and then enters the smartphone through the first connection interface and the data line, and the smartphone distributes power to the external screen device through the data line and the first connection interface. The specific power supply form may be designed according to the actual situation, and the specific power supply circuit is a mature technology and will not be described in detail here. In addition, the third connection interface 13 is connectable to the wireless microphone 20, so that the livestreamers and vloggers can perform livestreaming voice signal interaction operations through the wireless microphone 20.

Based on the above, by designing an external screen device for a smartphone, the external screen device has the first connection interface capable of data signal transmission with the smartphone through the data line, the second connection interface capable of charging and the third connection interface connectable to the microphone or wired earphones. The wired connection between the external screen device and the smartphone is formed through the data line and the first connection interface. Compared with the traditional WiFi transmission, the wire transmission has high anti-interference ability and signal transmission stability, so that the external screen device can receive data signals of the smartphone in real time and display real-time contents of livestreaming or photography with low delay and high stability, thus providing a better livestreaming or photography effect. Moreover, the second connection interface is connectable to a charging power source to supply power to the smartphone and the external screen device, thereby ensuring normal operation of the smartphone and the external screen device. In addition, the third connection interface is connectable to the wireless microphone to provide a high-quality audio input option, so that the livestreamers and vloggers can perform livestreaming voice interaction and recording more conveniently, which meets the high requirements of the livestreamers and vloggers for audio input. The external screen device is detachably attached to the back of the smartphone through the magnets, so there is no need to separately provide a holder structure for the external screen device, which makes the external screen device more portable. Thus, the external screen device is more convenient to use and has better user experience.

The above is only preferred examples of the disclosure, and is not intended to limit the technical scope of the disclosure in any form. Therefore, any minor modifications, equivalent changes and variations made to the above examples according to the technical essence of the disclosure still fall within the scope of the technical solutions of the disclosure.

The invention claimed is:

1. An external screen device for a smartphone, comprising a body, wherein the body comprises:
   a casing mounted in the casing;
   a circuit board, being provided with a mode button, and the mode button extends out of a side of the body;
   a screen covers a side of the casing and is located above the circuit board and electrically connected to the circuit board;
   a first connection interface connectable to a data line to realize data signal transmission with the smartphone and supply power to the external screen device;
   a second connection interface configured to be connected to an external power source to supply power to the external screen device and the smartphone; and
   a third connection interface configured to be connected to a microphone or wired earphones;
   wherein the first connection interface, the second connection interface and the third connection interface are all electrically connected to the circuit board.

2. The external screen device for a smartphone according to claim 1, wherein the body is provided with a magnet configured to fix the external screen device to a back of the smartphone by magnetic attraction.

3. The external screen device for a smartphone according to claim 1, wherein the first connection interface is a Type-C or Lightning interface; the second connection interface is a Type-C interface; and the third connection interface is a Type-C interface or a 3.5 mm audio interface.

4. The external screen device for a smartphone according to claim 1, wherein the third connection interface is a Type-C interface connectable to a wireless microphone.

5. The external screen device for a smartphone according to claim 1, wherein the first connection interface and the second connection interface are both arranged on a lower end of the body, and the third connection interface is arranged on a side of the body.

6. The external screen device for a smartphone according to claim 2, wherein a back of the body is provided with an annular groove, and the magnet is annularly distributed in the annular groove; and an outer side of the annular groove is covered with a back sticker.

7. The external screen device for a smartphone according to claim 6, wherein the back of the body is further provided with a vertical groove below the annular groove, and a magnet is embedded in the vertical groove.

8. The external screen device for a smartphone according to claim 1, wherein a lower end of the body is further provided with an indicator lamp configured to indicate a working state of the external screen device, the circuit board is provided with a light guide column, and the light guide column extends out of the lower end of the body.

9. The external screen device for a smartphone according to claim 1, wherein a length of the body is less than a length of the smartphone, and when the body is attached to a back of the smartphone, a rear facing camera of the smartphone is not blocked by the body.

\* \* \* \* \*